United States Patent [19]

Kitaura et al.

[11] 4,303,318
[45] Dec. 1, 1981

[54] CAMERA EXPOSURE TIME CONTROL DEVICE

[75] Inventors: Mashio Kitaura, Tondabayashi; Koji Yamamoto, Sakai, both of Japan

[73] Assignee: Minolta Camera Kabushiki Kaisha, Osaka, Japan

[21] Appl. No.: 219,955

[22] Filed: Dec. 24, 1980

[30] Foreign Application Priority Data

Dec. 31, 1979 [JP] Japan ................................ 54/171490

[51] Int. Cl.³ ..................... G03B 7/083; G03B 7/099
[52] U.S. Cl. .................................. 354/24; 354/49; 354/51
[58] Field of Search ............... 354/24, 49, 50, 51, 354/59, 60 R

[56] References Cited

U.S. PATENT DOCUMENTS 4,126,366 12/1978 Watanabe ............................ 354/24
4,131,350 12/1978 Uchiyama et al. ............... 354/51 X

FOREIGN PATENT DOCUMENTS

48/19254 6/1973 Japan .
52/49025 4/1977 Japan .
53/46725 4/1978 Japan .
54/151029 11/1979 Japan .

*Primary Examiner*—Michael L. Gellner
*Attorney, Agent, or Firm*—Watson, Cole, Grindle & Watson

[57] ABSTRACT

An exposure time control device for a camera which measures the light reflected from a surface of a leading shutter curtain and/or a surface of a film can determine exact exposure time even if difference exists between reflection factors of the surfaces, by means of a simple construction including no special light measuring circuit other than a light measuring circuit originally provided for the exposure time control purpose. A first memory or storage capacitor memorizes logarithmically compressed output of the light measuring circuit fed through a first switch when the first switch is opened in conjunction with start of the leading shutter curtain travel while a second storage or memory capacitor memorizes the output fed through a second switch when the second switch is opened in conjunction with completion of the leading shutter curtain travel. An operational circuit combines the output of the light measuring circuit at a time of full shutter opening with the output in the second memory capacitor subtracted by the output in the first memory capacitor, producing a corrected output. A time count circuit controls timing of trailing shutter curtain release in accordance with the corrected signal.

6 Claims, 2 Drawing Figures

CAMERA EXPOSURE TIME CONTROL DEVICE

BACKGROUND OF THE INVENTION

1. Field of the Invention

The present invention relates to a camera exposure time control device which permits exposure time control in response to the measurement of light reflected from a surface of a shutter curtain and/or a surface of a film.

2. Description of the Prior Art

With this type of exposure time control, if a surface of a first or leading shutter curtain and a surface of a film differ in reflection factor, a difference occurs in the light measurement output around the time when the shutter curtain starts travelling, causing an error in exposure time control. Since it is practically impossible to make the surface of the shutter curtain compatible in reflection factor with surfaces of all films available on the market, a light measurement output requires some correction during exposure control operation to ensure correct exposure time control at all times.

Japanese Patent Laid-Open Publication Nos. Sho 53-46725 and Sho 54-151029, for example, disclose a correction method, in which in addition to a light measuring circuit originally included in an exposure time control circuit is provided another light measuring circuit to detect a difference in reflection factor between a surface of a leading shutter curtain and a surface of a film. However, this method is disadvantageous in that the additional light measuring circuit makes an entire exposure time control circuit complex.

SUMMARY OF THE INVENTION

Accordingly, the primary object of the present invention is to provide a camera exposure time control device of the above type which requires no special light measuring circuit in addition to a light measuring circuit originally disposed to measure light for exposure time control with a resultant simple construction and which is capable of correct exposure time control at all times.

To accomplish this object, an exposure time control device of the present invention includes a light measuring circuit which generates a light measurement signal proportional to the logarithm of the intensity of the light received by light receiving means. The light receiving means is located to receive the light reflected from a surface of a leading shutter curtain before start of the leading shutter curtain travel, the light reflected from the surface of the leading shutter curtain and the uncovered surface of a film during the leading shutter curtain travel and the light reflected from the surface of the film after completion of the leading shutter curtain travel. First and second storing means are connected to the light measuring circuit for receiving and storing the light measurement signal through first and second switch means, respectively. The first switch means disconnects the first storing means from the light measuring circuit in conjunction with the start of the leading shutter curtain travel so that the light measurement signal commensurate with the intensity of the received light reflected from the surface of the leading shutter curtain is stored in the first storing means. The second switch means disconnects the second storing means from the light measuring circuit in conjunction with the completion of the leading shutter curtain travel so that the light measurement signal commensurate with the intensity of the received light which is reflected from the surface of the film, is stored in the second storing means. An operational circuit including a first input terminal connected to the first storing means, a second input terminal connected to the second storing means and a third input terminal connected to the light measuring circuit is arranged to generate a corrected signal by subtracting the light measurement signal to the second input terminal by the light measurement signal to the first input terminal and by combining the signal difference obtained by the subtraction with the light measurement signal to the third input terminal. A count circuit is provided to generate a shutter closing signal for actuating an electromagnetic means to thereby allow trailing shutter curtain travel when a period of time dependent on the corrected signal has lapsed from the start of the leading shutter curtain travel.

Since the light measurement signal is proportional to the logarithm of the intensity of the received light as described above, the light measurement signal to the second input terminal subtracted by the light measurement signal to the first input terminal represents the ratio of the reflection factor of the surface of the film to that of the surface of the leading shutter curtain. Thus, the intensity of the received light reflected from the surface of the film with the leading shutter curtain having completed travelling, is converted into such intensity of the same light which is supposedly reflected from the surface of the leading shutter curtain, and the corrected signal generated by the operational circuit is corrected from the light measurement signal to the third input terminal in accordance with the ratio of the reflection factor of the surface of the film to that of the surface of the leading shutter curtain.

If scene brightness remains unchanged throughout the exposure control operation, the light measurement signal to the third input terminal at a time after the completion of the leading shutter curtain travel coincides with the light measurement signal to the second input terminal stored in the second storing means. In this case, therefore, the light measurement signals to the second and third input terminals are cancelled with one another, so that exposure time is controlled in accordance with the light measurement signal to the first input terminal stored in the first storing means, i.e., in accordance with the intensity of the received light reflected from the surface of the leading shutter curtain, although the light receiving means receives the light reflected from the surface of the film as well as the light reflected from the surface of the leading shutter curtain.

If scene brightness is sufficient so that a proper exposure can be obtained by the trailing shutter curtain travel preceeding to the completion of the leading shutter curtain travel, the light receiving means receives only the light reflected from the surface of the leading shutter curtain. Thus, the light measurement signal to the third input terminal will coincide with that to first input terminal and, because the second storing means continues to be connected to the light measuring circuit before the completion of the leading shutter curtain travel, the light measurement signal to the second input terminal coincides with that to the third input terminal. In this case, the light measurement signals to the second and third input terminals are cancelled with one another as is similar to the above case, so that exposure time is controlled in accordance with the light measurement signal to the first input terminal, i.e., in accordance with the intensity of the received light reflected from the surface of the leading shutter curtain.

In contrast, if an electronic flash device is used due to insufficient scene brightness and is fired in synchronism with full opening of the shutter, the light measurement signal to the third input terminal at a time after the completion of the leading shutter curtain travel differs from the light measurement signal to the second input terminal stored in the second storing means in conjunction with the completion of the leading shutter curtain travel. In this case, the corrected signal is corrected from the light measurement signal to the third input terminal as described above, and exposure time is controlled with no error incurred even if any difference exists between the reflection factors of the surface of the film and the surface of the leading shutter curtain. This allows films having different reflection factors to be used with the camera irrespective of the films being different types or a particular type.

The above and other objects and features of the present invention becomes more apparent from the following description of a preferred embodiment with reference to the accompanying drawings.

DESCRIPTION OF A PREFERRED EMBODIMENT

Description will be given of an embodiment in which the present invention is applied to a single lens reflex camera.

Figure 1:
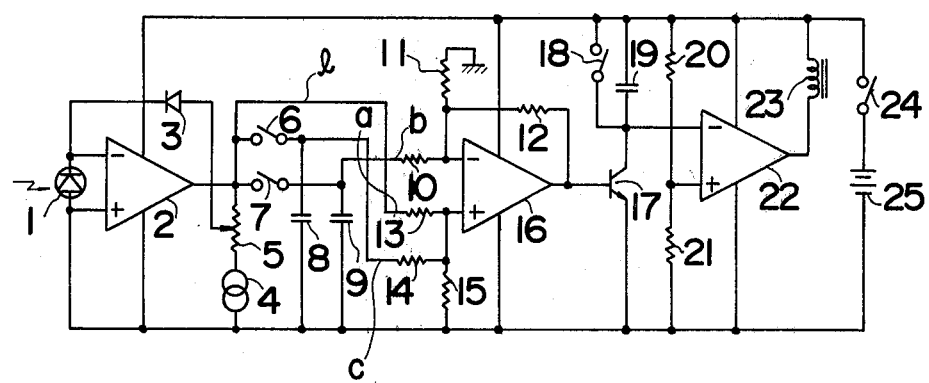
FIG. 1 is a circuit diagram of an exposure time control device in accordance with an embodiment of the present invention.

With reference to FIG. 1, which shows a circuit of the embodiment of the present invention, light receiving element 1 receives the light reflected from leading shutter curtain surface S and/or film surface F, and the output current thereof is converted into a voltage signal which is logarithmically compressed by a logarithmic converter circuit comprising operational amplifier 2, logarithmic compression diode 3 constituting a feedback circuit for operational amplifier 2, constant-current source 4 and resistor 5. The signal is stored through switch 6 into capacitor 8 and also through switch 7 into capacitor 9. in addition, the signal is directly applied by lead wire 1 in the diagram through resistor 13 to the positive input terminal of operational amplifier 16. A signal at lead wire 1 in the diagram assumes the value Vb, representative of a logarithm of the light intensity reflected from leading shutter curtain surface S before leading shutter curtain S starts traveling, but is changed to Va when a part of a film is uncovered due to the travel of the leading shutter curtain and finally changed to Vc for the period before a second or trailing shutter curtain (not shown) starts traveling with first shutter curtain S completed travelling, in accordance with the shutter release operation stages. Va corresponds to the light reflected partially by the leading shutter curtain and partially by the uncovered film. Switch 6 is turned off when leading shutter curtain S starts traveling, causing capacitor 8 to store light measurement output Vb (logarithmically converted value) of the light reflected from leading shutter curtain surface S before leading shutter curtain S starts traveling after diaphragm D has been stopped down. Switch 7 is turned off after leading shutter curtain S has completed travelling. This causes capacitor 9 to store light measurement output Vc of the light reflected only from film surface F. Operational amplifier 16 and resistors 10 through 15 together constitute an operational circuit which adds the voltage to input terminal a to the voltage to input terminal b and which subtracts the voltage to input terminal c from the voltage resulting from the addition. Assume that the voltage at lead wire 1, i.e., the voltage to input terminal a, is Va, the voltage at the positive terminal of capacitor 8 i.e., the voltage to input terminal b is Vb and the voltage at the positive terminal of capacitor 9, i.e., the voltage to input terminal c, is vc, and the output voltage vd of operational amplifier 16 is written below as is clear from the diagram:

$$vd = va + vb - vc = va - (vc - vb) \tag{1}$$

Voltage vd is applied to the base of transistor 17, and the value of vd is logarithmically expanded into a current which flows through the collector and the emitter of transistor 17, causing capacitor 19 to be charged. When the voltage at the negative terminal of capacitor 19 goes below the level of a voltage at power source 25 divided by resistors 20 and 21, the output of comparator circuit 22 is inverted to turn off magnet 23, whereby the trailing shutter curtain is released from its arrestment to start traveling.

Figure 2:
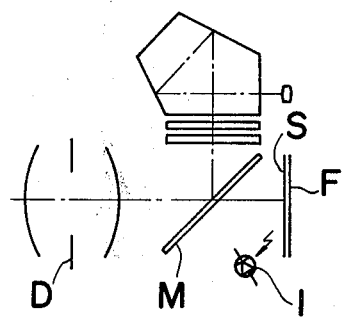
FIG. 2 is a schematic illustration showing the layout of light measuring elements inside a camera.

Definite description will now be given of the operation of the circuitry. Before the start of photography, switches 6, 7 and 18 are turned ON and switch 24 OFF. Switch 24 is turned ON when the shutter release button (not shown) is depressed into a first stage, causing a voltage from power source 25 to be applied to the entire circuitry. With the release button depressed into a second stage, movable mirror M shown in FIG. 2 is lifted up and diaphragm D is stopped down to a present aperture value. In response to the completion of the diaphragm stopping-down operation, leading shutter curtain S starts traveling and at the same time, switches 6 and 18 are turned OFF, causing capacitor 19 to be charged to start time counting. Switch 7 is turned OFF when leading shutter curtain S has completed travelling. The trailing shutter curtain starts traveling, regardless of leading shutter curtain S completing travelling, when the voltage at the negative terminal of capacitor 19 reaches a predetermined level. Next, description is given of the exposure control operation of the circuitry in two cases:

Case 1: Trailing Shutter Curtain Starts Traveling Before Leading Shutter Curtain S has Completed Travelling In this case, exposure time control has been completed before switch 7 is opened. Therefore, switch 7 may be considered to remain closed. This causes voltage va at lead wire 1 to be always equal to voltage vc at capacitor 9, the value of vd from equation (1) above is expressed as follows:

$$vd = va - (vc - vb) = vb$$

As a result, exposure time control is performed by voltage vb stored in capacitor 8. As described earlier, Vb is a light measurement output of the light reflected from leading shutter curtain surface S immediately before leading shutter curtain S starts traveling, allowing exposure time control to be performed by the measurement of the light reflected from leading shutter curtain surface S.

Case 2: Trailing Shutter Curtain Starts Traveling After Leading Shutter Curtain S Has Completed Travelling Since switch 7 remains ON before leading shutter curtain S is fully opened, the following is true, as similar to the previously described case:

$$vd = vb$$

Switch 7 is turned off after leading shutter curtain S has completed travelling, causing vc to be fixed at a value at a time immediately before switch 7 is turned off. However, va=vc (as is true before switch 7 is turned off) remains unchanged unless scene brightness is changed, resulting in vd=vb, whereby exposure time control is performed by a light measurement output of the light reflected from leading shutter curtain surface S. In flash photography, however, scene brightness is never left unchanged after leading shutter curtain S has completed travelling. In this case, vc is fixed to be a light measurement output of the light reflected from film surface F before the emission of flashlight whereas the value of va varies in response to the light reflected from film surface F, the reflected light varying in accordance with the emission of flashlight. This results in va≠vc, and vd is written from equation (1) as follows:

$$vd = va - (vc - vb)$$

wherein the contents in the parenthesis of the equation represent a ratio of a reflection factor of film surface F to that of leading shutter curtain surface S. According to the equation, va, which corresponds to the intensity of the light currently reflected from film surface F, is corrected in accordance with the ratio, so that vd represents a value corresponding to the intensity of the same light supposedly reflected from leading shutter curtain surface S. Therefore, it can be stated that the circuitry of the embodiment always controls an exposure time without being affected by any difference in reflection factor between leading shutter curtain surface S and film surface F.

What is claimed is:

1. In a camera which includes a focal plane shutter having leading and trailing shutter curtains for controlling the light reaching a film located at the focal plane of said camera, an exposure time control device comprising:

a light measuring circuit including light receiving means located to receive the light reflected from a surface of said leading shutter curtain before start of the travel of said leading shutter curtain, the light reflected from the surface of said leading shutter curtain and a surface of said film during the travel of said leading shutter curtain and the light reflected from the surface of said film after completion of the travel of said leading shutter curtain, said light measuring circuit generating a light measurement signal which is proportional to the logarithm of the intensity of said light received by said light receiving means;

first and second storing means for storing the light measurement signal from said light measuring circuit;

a first switch means arranged between said light measuring circuit and said first storing means for disconnecting said first storing means from said light measuring circuit in conjunction with the start of the travel of said leading shutter curtain;

a second switch means arranged between said light measuring circuit and said second storing means for disconnecting said second storing means from said light measuring circuit in conjunction with the completion of the travel of said leading shutter curtain;

an operational circuit having a first input terminal connected to said first storing means, a second input terminal connected to said second storing means and a third input terminal connected to said light measuring circuit, and generating a corrected signal by combining the light measurement signal to said third input terminal with the light measurement signal to said second input terminal subtracted by the light measurement signal to said first input terminal;

means for generating a shutter closing signal for actuating said shutter closing means when a period of time dependent on the corrected signal has lapsed from the start of the travel of said leading shutter curtain; and electromagnetic means for starting the travel of said trailing shutter member in response to said shutter closing signal.

2. An exposure time control device as defined in claim 1, wherein said operational circuit includes an addition circuit for adding the light measurement signal to said first input terminal to the light measurement signal to said third input terminal and a differential amplifier for generating said corrected signal by subtracting said light measurement signal to said second input terminal from the sum of said light measurement signals to said first and third input terminals.

3. An exposure time control device as defined in claim 1, wherein said first switch means includes a normally closed switch opened in conjunction with the start of the travel of said leading shutter curtain and said second switch means includes a normally closed switch opened in conjunction with the completion of the travel of said leading shutter curtain.

4. An exposure time control device as defined in claim 3, wherein said shutter closing signal generating means includes:

a logarithmic expansion circuit for generating a current whose amount is proportional to the logarithmic expansion of the corrected signal;

a capacitor connected to said logarithmic expansion circuit;

a count switch opened simultaneously with the opening of said first switch for allowing said current to charge said capacitor; and a shutter closing signal generating circuit for generating said shutter closing signal when said capacitor has been charged up to a predetermined voltage.

5. An exposure time control device as defined in claim 4, wherein said light receiving means consists of a photodiode and said light measuring circuit includes a logarithmic compression circuit for generating a voltage which is proportional to the logarithm of the output current produced by said photodiode, said voltage being said light measurement signal.

6. An exposure time control device as defined in claim 5, wherein said first storing means includes a first memory or storage capacitor connected to said logarithmic compression circuit through said first switch and said second storing means includes a second memory or storage capacitor connected to said logarithmic compression circuit through said second switch.

* * * * *